(12) United States Patent
Hiki

(10) Patent No.: US 9,244,703 B2
(45) Date of Patent: Jan. 26, 2016

(54) SERVER SYSTEM AND MANAGEMENT UNIT IDENTIFYING A PLURALITY OF BUSINESS APPLICATION SOFTWARE ON A VIRTUAL MACHINE BASED ON A PROGRAM BOUNDARY FOR DYNAMIC RESOURCE ALLOCATION

(75) Inventor: Yusuke Hiki, Yokohama (JP)

(73) Assignee: HITACHI, LTD., Tokyo (JP)

( * ) Notice: Subject to any disclaimer, the term of this patent is extended or adjusted under 35 U.S.C. 154(b) by 169 days.

(21) Appl. No.: 13/824,185

(22) PCT Filed: Nov. 12, 2010

(86) PCT No.: PCT/JP2010/006664
§ 371 (c)(1),
(2), (4) Date: Jun. 28, 2013

(87) PCT Pub. No.: WO2012/063296
PCT Pub. Date: May 18, 2012

(65) Prior Publication Data
US 2013/0305243 A1     Nov. 14, 2013

(51) Int. Cl.
*G06F 9/455* (2006.01)
*G06F 9/50* (2006.01)

(52) U.S. Cl.
CPC ............ *G06F 9/455* (2013.01); *G06F 9/45533* (2013.01); *G06F 9/5077* (2013.01)

(58) Field of Classification Search
None
See application file for complete search history.

(56) References Cited

U.S. PATENT DOCUMENTS

| | | | | |
|---|---|---|---|---|
| 7,577,722 | B1* | 8/2009 | Khandekar et al. | 709/220 |
| 2004/0143664 | A1* | 7/2004 | Usa et al. | 709/226 |
| 2004/0194089 | A1* | 9/2004 | McCarthy et al. | 718/100 |
| 2004/0221290 | A1* | 11/2004 | Casey et al. | 718/104 |
| 2005/0039183 | A1* | 2/2005 | Romero et al. | 718/100 |
| 2007/0180449 | A1* | 8/2007 | Croft et al. | 718/1 |
| 2008/0126547 | A1* | 5/2008 | Waldspurger | 709/226 |

(Continued)

FOREIGN PATENT DOCUMENTS

| | | |
|---|---|---|
| JP | 63-008833 A | 1/1988 |
| JP | 10-240699 A | 9/1998 |

(Continued)

OTHER PUBLICATIONS

Oracle, The Java EE 5 Tutorial, 2010, http://docs.oracle.com/javaee/5/tutorial/doc/bnaby.html.*

*Primary Examiner* — Meng An
*Assistant Examiner* — Jorge A Chu Joy-Davila
(74) *Attorney, Agent, or Firm* — Volpe and Koenig, P.C.

(57) ABSTRACT

A server system for providing a plurality of virtual machines constructed on a physical machine with a physical resource is provided. Each virtual machines includes an OS recognizing the physical resource allocated to the virtual machine as a resource in the virtual machine and a software management unit for securing the resource recognized by the OS and allocating the resource to a plurality of pieces of business application software registered in the virtual machine. The software management unit identifies the plurality of pieces of business application software and allocates the resource to the same plurality of pieces of business application software according to a preset policy to allocate the resource. When the software management unit detects an increase or decrease of the resource allocated to the virtual machine, it changes allocation of the resource to the plurality of pieces of business application software according to the change in resources.

15 Claims, 15 Drawing Sheets

(56) References Cited

U.S. PATENT DOCUMENTS

2009/0222842 A1* 9/2009 Narayanan et al. ........... 719/328
2009/0327482 A1* 12/2009 Malhotra et al. .............. 709/224
2010/0058342 A1   3/2010 Machida

FOREIGN PATENT DOCUMENTS

| JP | 2004-199561 A | 7/2004 |
| JP | 2008-204243 A | 9/2008 |
| JP | 2009-059298 A | 3/2009 |

* cited by examiner

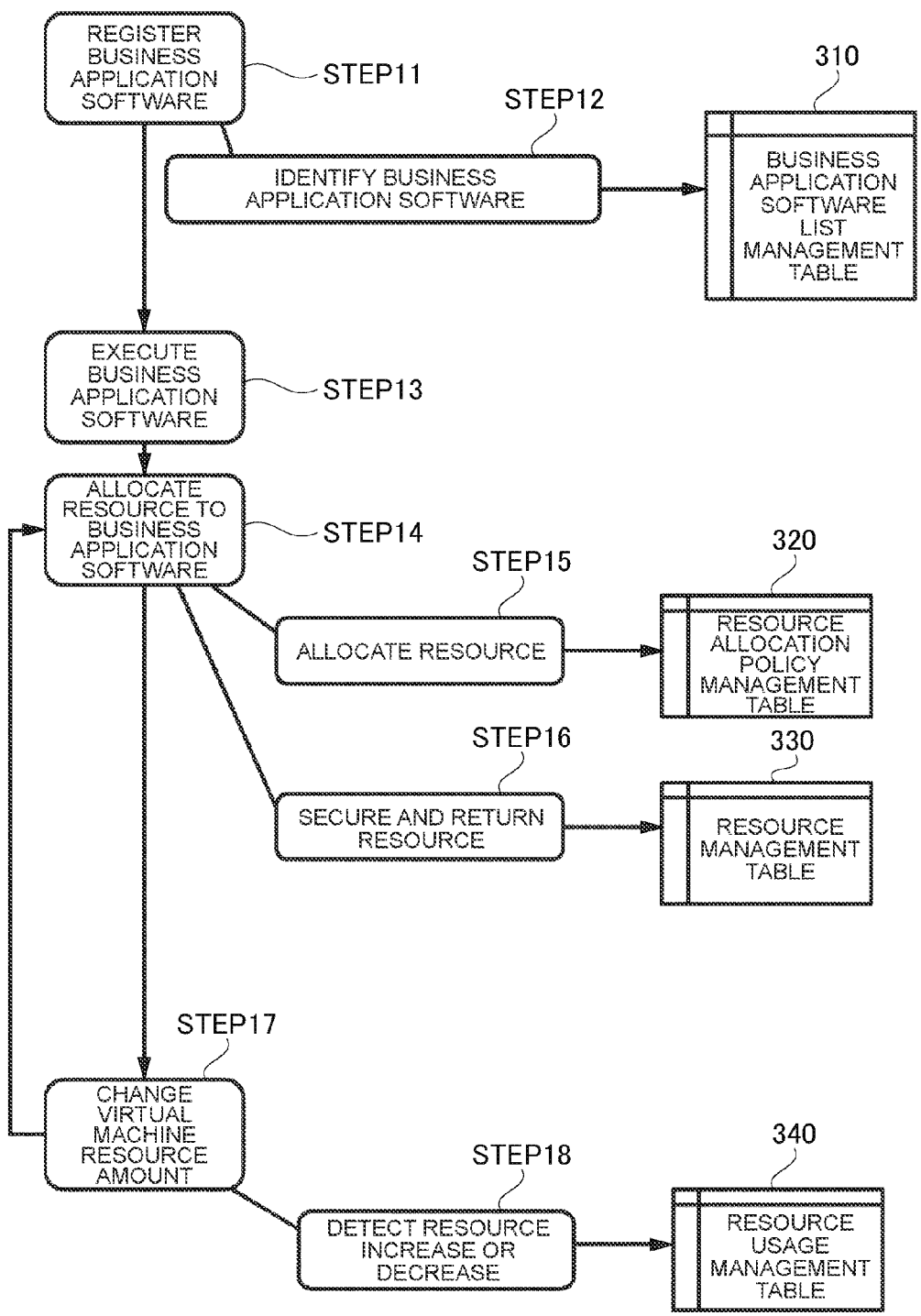

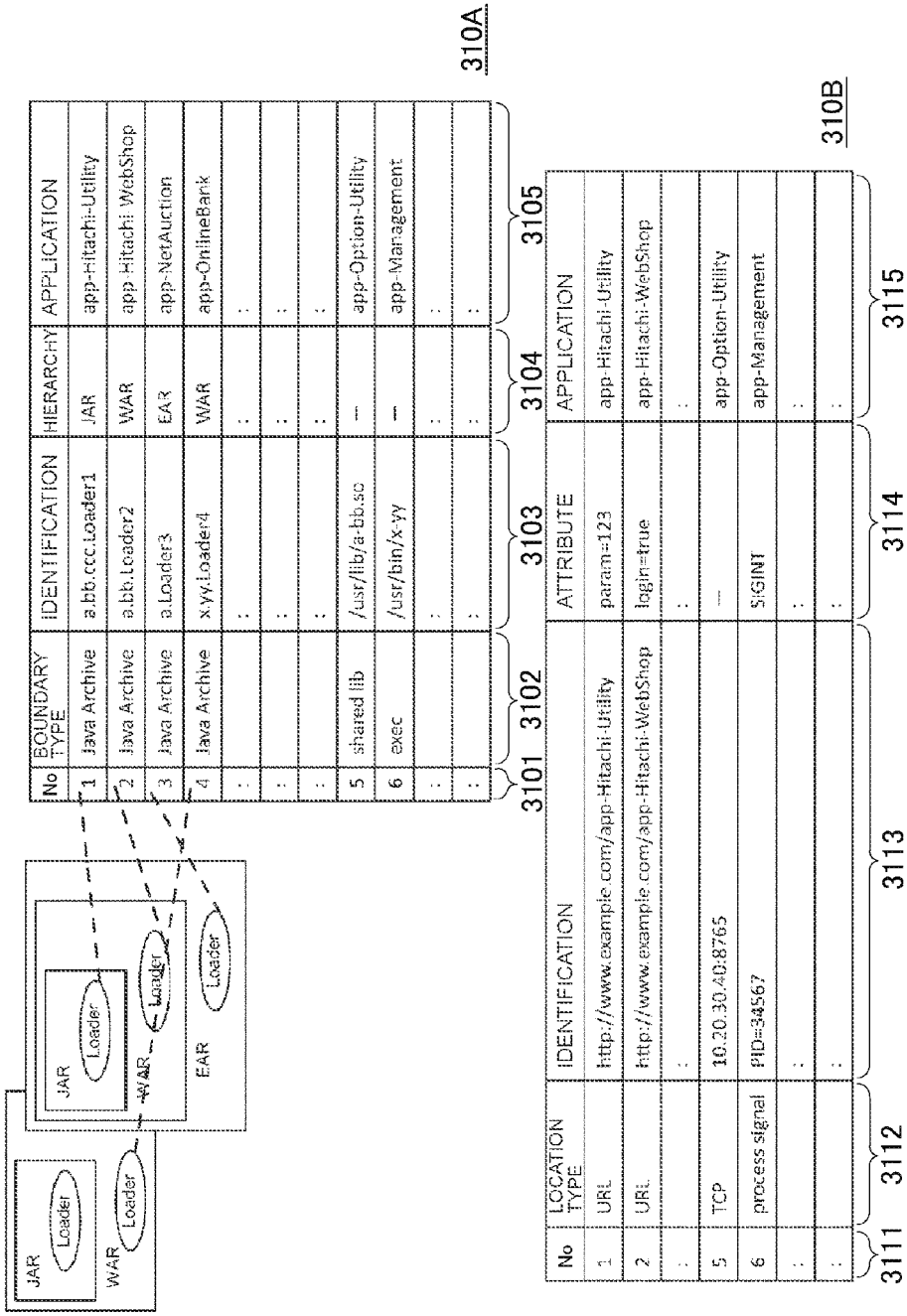

| RESOURCE TYPE | CPU | | | | |
|---|---|---|---|---|---|
| No | APPLICATION | POLICY TYPE | UPPER LIMIT | LOWER LIMIT | SHARING |
| 1 | app-Hitachi-Utility | RATIO MAINTENANCE | 15% | 0% | --- |
| 2 | app-Hitachi-WebShop | RATIO MAINTENANCE | 20% | 0% | --- |
| 3 | app-NetAuction | RATIO MAINTENANCE | 55% | 30% | --- |
| 4 | app-OnlineBank | RATIO MAINTENANCE | 20% | 0% | --- |
| ... | | | | | |
| 3201 | | 3203 | 3204 | 3205 | 3206 |
| | 3202 | | | | |

320B

| RESOURCE TYPE | MEMORY | | | | |
|---|---|---|---|---|---|
| No | APPLICATION | POLICY TYPE | UPPER LIMIT | LOWER LIMIT | SHARING |
| 1 | app-Hitachi-Utility | SHARING ADJUSTMENT | 100 | 50 | |
| 2 | app-Hitachi-WebShop | SHARING ADJUSTMENT | 1,000 | 500 | 6,250 |
| 3 | app-NetAuction | SHARING ADJUSTMENT | 10,000 | 2,000 | |
| 4 | app-OnlineBank | SHARING ADJUSTMENT | 2,000 | 1,000 | |
| ... | | | | | |
| 3211 | | 3213 | 3214 | 3215 | 3216 |
| | 3212 | | | | |

320C

| RESOURCE TYPE | CONNECTION | | | | |
|---|---|---|---|---|---|
| No | APPLICATION | POLICY TYPE | UPPER LIMIT | LOWER LIMIT | SHARING |
| 1 | app-Hitachi-Utility | SHARING ADJUSTMENT | --- | --- | |
| 2 | app-Hitachi-WebShop | SHARING ADJUSTMENT | 32 | 6 | 48 |
| 3 | app-NetAuction | SHARING ADJUSTMENT | 64 | 6 | |
| 4 | app-OnlineBank | SHARING ADJUSTMENT | 12 | 2 | |
| ... | | | | | |
| 3221 | | 3223 | 3224 | 3225 | 3226 |
| | 3222 | | | | |

SERVER SYSTEM AND MANAGEMENT UNIT IDENTIFYING A PLURALITY OF BUSINESS APPLICATION SOFTWARE ON A VIRTUAL MACHINE BASED ON A PROGRAM BOUNDARY FOR DYNAMIC RESOURCE ALLOCATION

TECHNICAL FIELD

The present invention relates to a server system and a resource management method and program and is suited for application to a server system and resource management method and program for managing resources for virtual machines.

BACKGROUND ART

With a conventional computer system, computer resources (hereinafter referred to as the resource(s)) mounted in a physical server machine are firstly occupied by an OS (Operating System). Then, a software management program operating on the OS secures a specified amount of resources among the resources recognized by the OS in accordance with a predetermined definition. The above-described software management program is software that provides application software with a higher-level and more specific function than that of the OS; and, for example, middleware can be an example of the software program. Furthermore, the software management program allocates the resources to application software operating on the software management program in accordance with a predetermined definition.

However, with the above-described computer system, the OS detects a new resource at the time of activation and occupies the resource, but it has to manually change the definition of the resource amount secured by the software management program. Also, the definition of the resource allocation to the business application software needs to be changed manually. Accordingly, when the resource amount required by the entire system changes, it is necessary to stop the system once and then increase or decrease the physical resource.

Incidentally, with recent computer systems, a virtual machine technique to virtually divide physical resources of a server system by using software and construct a plurality of "virtual machines" on the server is implemented. This virtual machine technique can deploy a plurality of virtual machines on one physical server and operate an OS independently at each virtual machine. Under this circumstance, a resource amount allocated to each virtual machine can be flexibly divided without being bound by the configuration of the physical resources and the resource amount can be changed dynamically without stopping the system. Therefore, even when the resource amount required by the entire system changes, the resource amount which can be used by the OS of each virtual machine can be increased or decreased flexibly without stopping the system once.

However, although the OS of each virtual machine can flexibly increase or decrease the available resource amount as described above, the software management program operating on the OS does not have a function that detects a change of the resource amount or automatically identifies business application software. So, the software management program cannot dynamically manage the resources secured by itself or the resources to be allocated to the business application software.

Therefore, when the resource amount required by the entire system changes, a technique to prepare a virtual machine itself separately, that is, to promptly enhance computer performance by a so-called scale-in/scale-out method is disclosed (for example, Patent Literature 1). According to Patent Literature 1, when the resource amount of the entire system changes, the influence of a change in the settings of the software management program can be reduced by preparing a virtual machine separately and increasing or decreasing the resource amount.

CITATION LIST

Patent Literature

[Patent Literature 1] Japanese Patent Application No. 2008-553110

SUMMARY OF INVENTION

Problems to be Solved by the Invention

However, when the resource amount of each virtual machine is changed by server virtualization, it is desirable to flexibly increase or decrease the resource amount, which can be used by the OS, and automate changes of the settings of the system and enhance resource use efficiency by dynamically changing the resource amount secured by the software management program and dynamically changing the resource amount allocated to each piece of application software.

The present invention was devised in consideration of the above-described circumstances and aims at suggesting a server system and resource management method and program capable of dynamically changing the settings of the resource amount by the software management program of the virtual machine.

Means for Solving the Problems

In order to solve the above-described problem, a server system for providing a plurality of virtual machines constructed on a physical machine equipped with a physical resource is provided according to the present invention, wherein each of the virtual machines includes: an OS recognizing the physical resource allocated to the virtual machine as a resource in the virtual machine; and a software management unit for securing the resource recognized by the OS and allocating the resource to a plurality of pieces of business application software registered in the virtual machine; wherein the software management unit identifies the plurality of pieces of business application software and allocates the resource to the plurality of pieces of business application software according to a preset policy to allocate the resource; and wherein when the software management unit detects an increase or decrease of the resource allocated to the virtual machine, it changes allocation of the resource to the plurality of pieces of business application software in accordance with an amount of the detected resource increase or decrease.

When the above-described configuration is used and the physical resources allocated to the plurality of virtual machines constructed on the physical machine are allocated based on a resource allocation policy for each of the plurality of pieces of business application software and the resources allocated to the virtual machines increase or decrease, the allocation of the resources to the business application software is changed according to the resource increase/decrease amount. Accordingly, when the resource amount of each virtual machine is changed flexibly by server virtualization, the software management unit can dynamically detect the change of the resource amount for the virtual machine and the change of the resource amount can be reflected appropriately in each piece of business application software. Therefore, it is no longer necessary to allocate the resource amount manually and the stable operation of the system can be realized by reducing operating cost of the entire system and enhancing the resource use efficiency.

Advantageous Effects of Invention

According to the present invention, the resource use efficiency can be enhanced by dynamically changing the settings of the resource amount by the software management program of the virtual machine and thereby automating the change of the settings of the system.

BRIEF DESCRIPTION OF DRAWINGS

FIG. 4 is a conceptual diagram illustrating the outlines of the operation of a server system according to the embodiment.

FIG. 5 is a chart illustrating an example of a business application software list management table according to the embodiment.

FIG. 6 is a chart illustrating an example of a resource allocation policy management table according to the embodiment.

DESCRIPTION OF EMBODIMENTS

An embodiment of the present invention will be explained in detail with reference to the attached drawings.

(1) Configuration of Computer System

Figure 1:
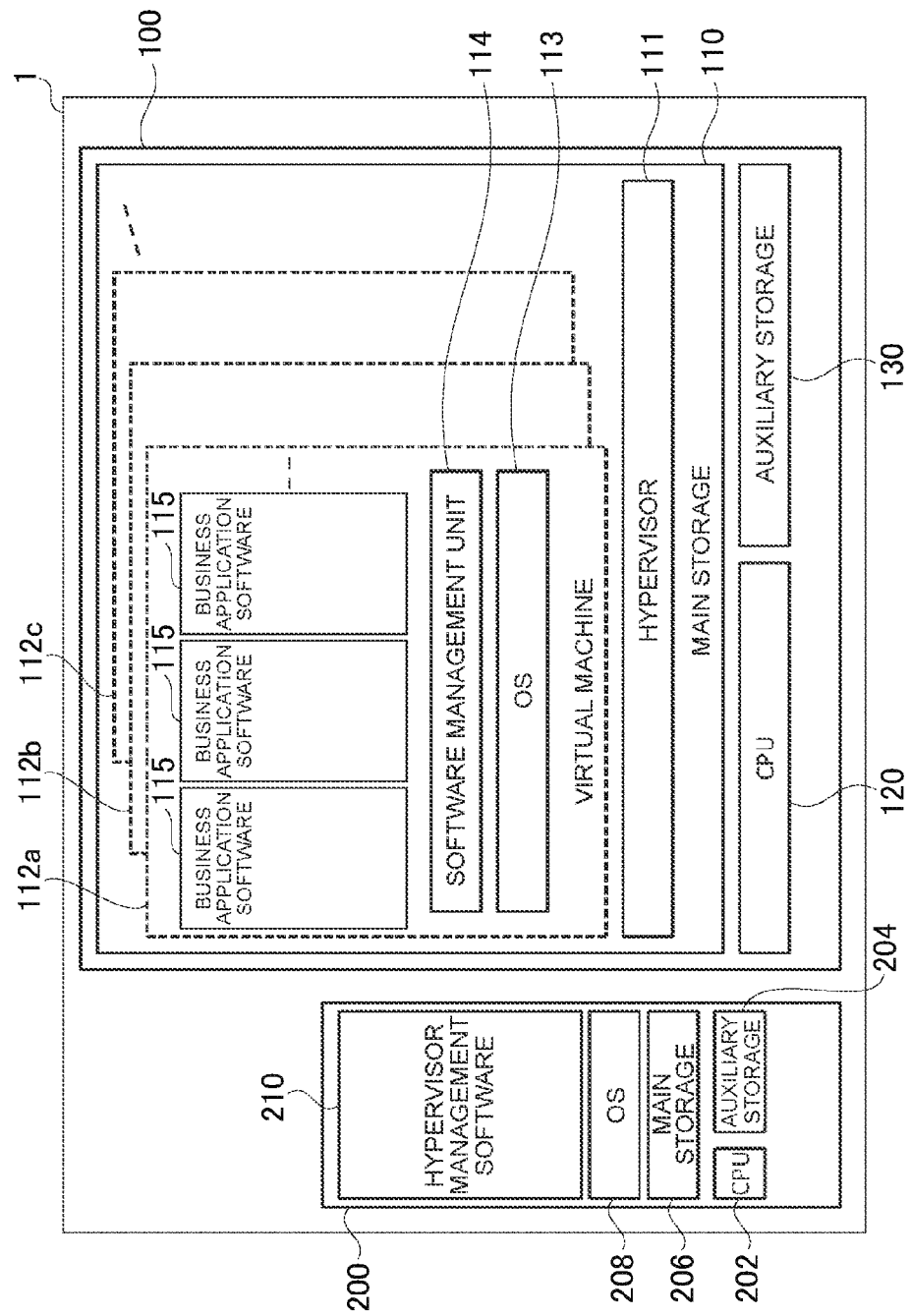
FIG. 1 is a block diagram illustrating the overall configuration of computer system according to an embodiment of the present invention.

The configuration of a computer system 1 according to this embodiment will be firstly explained. As depicted in FIG. 1, the computer system 1 according to this embodiment is constructed from a server system 100 and a server system 200. The server system 100 and the server system 200 are connected via a network such as a SAN (Storage Area Network) or LAN (Local Area Network).

The server system 100 and the server system 200 are information processing devices equipped with physical computer resources. The physical computer resources (hereinafter sometimes referred to as the resources) of the server system 100 are virtually divided and the virtually divided resources are allocated to a plurality of virtual machines constructed on the server system 100. The server system 100 will be hereinafter referred to and explained as the virtualization server 100. Furthermore, the server system 200 is an apparatus for managing the configuration of the virtual machines in the virtualization server 100. The server system 200 will be hereinafter referred to and explained as the management server 200. Incidentally, in this embodiment, the virtualization server 100 and the management server 200 are constructed as separate apparatuses; however, the invention is not limited to this example and the virtualization server 100 and the management server 200 may be constructed as an integrated apparatus.

Firstly, a hardware configuration of the virtualization server 100 will be explained. As depicted in FIG. 1, the virtualization server 100 is constructed from main storage 110, a CPU (Central Processing Unit) 120, and auxiliary storage 130.

The main storage 110 stores, for example, programs and operation parameters used by the CPU 120 and is composed of, for example, ROM (Read Only Memory) or RAM (Random Access Memory). Moreover, the physical resources mounted in the virtualization server 100 are virtually divided by a hypervisor 111 which is one of programs stored in the main storage 110, thereby constituting a plurality of virtual machines 112a, 112b, 112c (hereinafter referred to as the virtual machine 112).

Each of the plurality of virtual machines 112 constructed by the hypervisor 111 is equipped with software such as an OS 113 and a software management unit 114. The software in the virtual machine 112 operates as if the virtual machine 112 were the same as the physical machine.

The OS 113 controls the physical resources for the virtualization server 100. Specifically speaking, the OS 113 in the virtual machine 112 operates as if one virtual machine 112 were one physical machine; and occupies the resources for the virtual machine 112.

The software management unit 114 is a program operating on the OS 113 and is software for providing each piece of business application software 115 with a higher-level and more specific function than that of the OS 113; and, for example, middleware can be an example of the software management unit 114. Specifically speaking, the software management unit 114 executes, for example, processing for inputting and outputting common data in each piece of business application software 115, communication processing, and error processing. Moreover, the software management unit 114 has a function that secures the resources to be supplied to the OS 113 once and then allocates the resources to each piece of business application software 115.

Moreover, the business application software 115 is software for realizing unique business activities required by each system and operates within the range of the resources allocated by the software management unit 114. Regarding the business application software 115, different business application software 115 may be mounted in the plurality of virtual machines 112 or the same business application software 115 may be mounted in each virtual machine 112.

The CPU 120 functions as an arithmetic processing unit and control device and controls the entire operation in the virtualization server 100 in accordance with various programs stored in the main storage 110. Moreover, the CPU 120 may be a microprocessor.

The auxiliary storage 130 is a data storage device constructed as an example of a storage unit for the virtualization server 100 and can include, for example, storage media, recording devices for recoding data in the storage media, reading devices for reading data from the storage media, and deletion devices for deleting data recorded in the storage media. The auxiliary storage 130 is composed of, for example, HDDs (Hard Disk Drives). This auxiliary storage 130 drives hard disks and stores programs executed by the CPU 120 and various data.

Next, a hardware configuration of the management server 200 will be explained. As depicted in FIG. 1, the management server 200 is constructed from a CPU 202, auxiliary storage 204, main storage 206, an OS 208, and hypervisor management software 210.

The CPU 202 functions as an arithmetic processing unit and control device and controls the entire operation in the management server 200 in accordance with various programs. Moreover, the auxiliary storage 204 is a data storage device constructed as an example of a storage unit for the management server 200 and can include, for example, storage media, recording devices for recoding data in the storage media, reading devices for reading data from the storage media, and deletion devices for deleting data recorded in the storage media. The auxiliary storage 204 is composed of, for example, HDDs (Hard Disk Drives). This auxiliary storage 204 drives hard disks and stores programs executed by the CPU 202 and various data.

The main storage 206 stores, for example, programs and operation parameters used by the CPU 202 and is composed of, for example, a ROM (Read Only Memory) or a RAM (Random Access Memory). The OS 208 control physical resources for the virtualization server 100.

The hypervisor management software 210 is software for managing the hypervisor 111 for the virtualization server 100 and controls the hypervisor 111 in accordance with an administrator's input to add a virtual machine 112 or change, for example, the configuration of the virtual machine 112.

Figure 2:
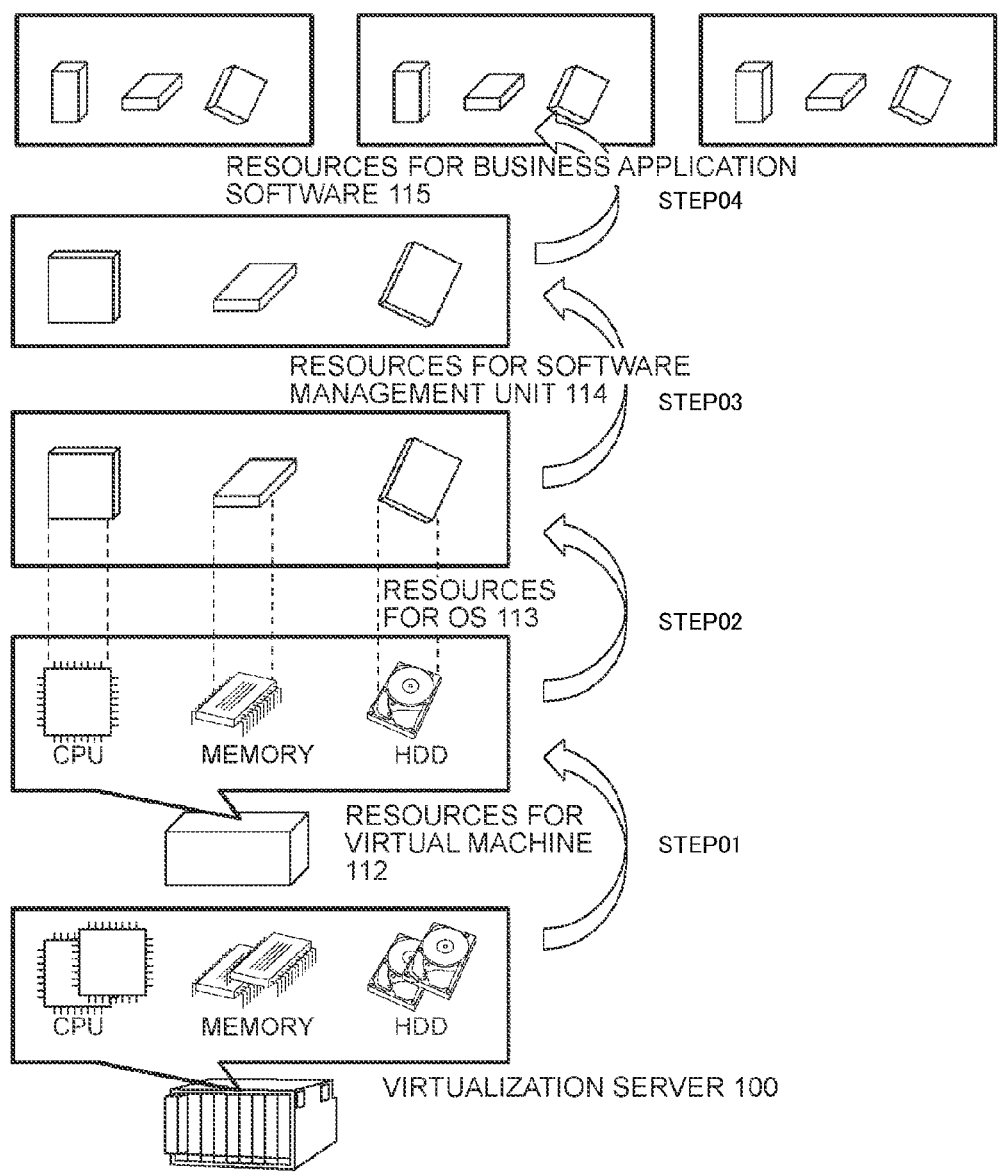
FIG. 2 is a schematic representation of the structure of resources according to the embodiment.

Next, the structure of the resources for the virtualization server 100 will be explained. FIG. 2 schematically illustrates the resources recognized by each device and each program. Moreover, a method of recognizing the resources by each device and each program will also be explained together with the explanation about the structure of the resources. Incidentally, in this embodiment, for example, CPUs, memories, and HDDs are taken and explained as examples of the resources for the virtualization server 100; however, the resources are not limited to these examples. For example, various networks can be taken as examples of the resources for the virtualization server 100.

As depicted in FIG. 2, the virtualization server 100 is equipped with physical resources such as CPUs, memories, and HDDs. The resources mounted in the virtualization server 100 are allocated to each virtual machine 112 by the hypervisor 111 (STEP 01). Specifically speaking, the resources are allocated to each virtual machine 112 and the resource allocation to each virtual machine 112 is changed according to input by, for example, the administrator under control of the hypervisor management software 210 of the management server 200.

Then, the OS 113 for each virtual machine 112 recognizes the resources in the virtual machine, which were allocated in STEP 01 (STEP 02). The resources recognized by the OS 113 are used by the software management unit 114.

Then, the software management unit 114 for each virtual machine 112 secures the resources recognized by the OS 113 (STEP 03). In this embodiment, the software management unit 114 detects that the resources are allocated to the virtual machine 112 and the allocation of the resources is recognized by the OS 113. Then, the software management unit 114 secures resources required by the software management unit 114 from among the detected resources.

Then, the software management unit 114 allocates the resources secured in STEP 03 to each piece of business application software 115. In this embodiment the software management unit 114 analyzes the structure of each piece of business application software 115 and manages the resources for each piece of business application software 115.

Conventionally, the OS 113 for each virtual machine 112 has been capable of flexibly increasing or decreasing the amount of available resources, but the software management unit 114 operating on the OS 113 did not have a function that detects any change of the resource amount or automatically identifies the business application software 112. Therefore, the resources secured by itself or the resources to be allocated to the business application software could not be managed dynamically.

However, in this embodiment as described above, the software management unit 114 automatically detects the allocation of the resources to the virtual machine 112 and allocates them to each piece of business application software 115. So, even if the resources for each virtual machine 112 are changed flexibly by means of server virtualization, the software management unit 114 can dynamically change the resource amount to be used.

Incidentally, in this embodiment, the software management unit 114 changes the resource amount to be allocated to the business application software 115; however, the invention is not limited to this example. For example, when data is read and written in files, the resource amount to be allocated may be changed for each file.

(2) Software Configuration of Virtualization Server

Figure 3:
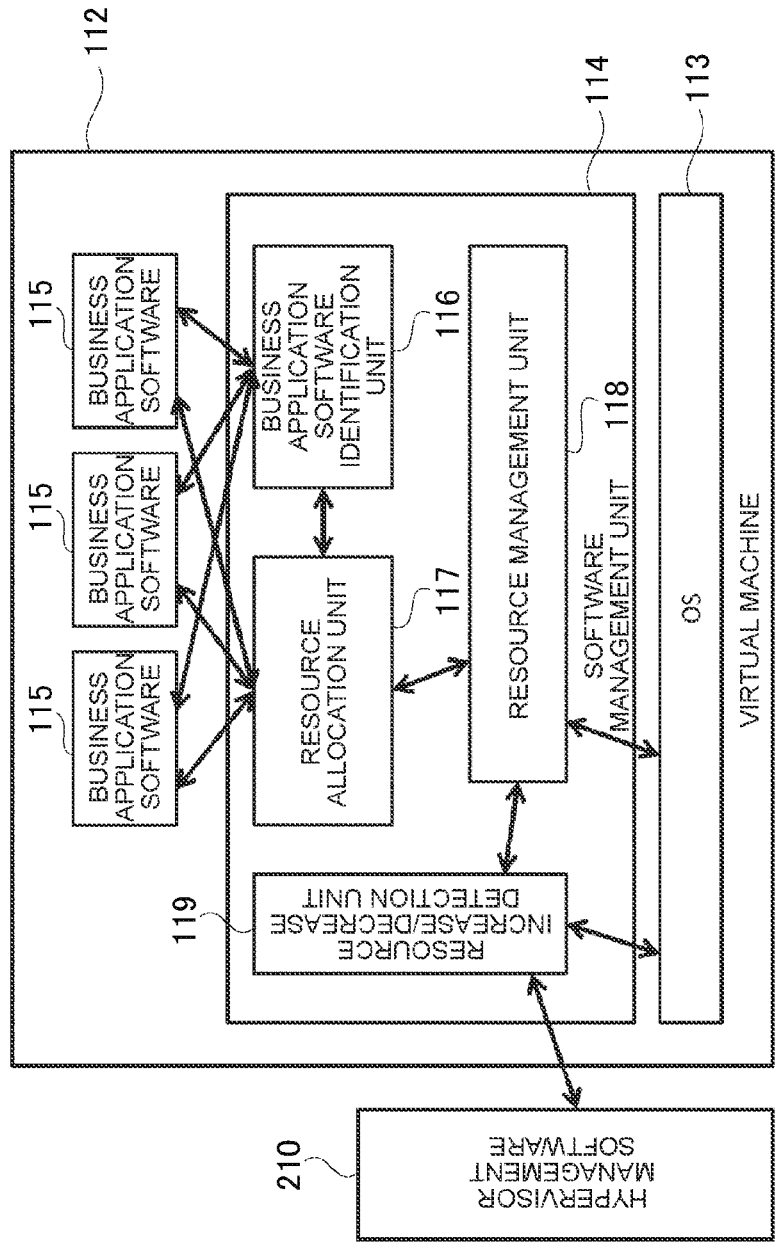
FIG. 3 is a block diagram illustrating the configuration of a software management unit according to the embodiment.

Next, a software configuration of the virtualization server 100 will be explained. Particularly, the configuration of the software management unit 114 for the virtualization server 100 will be explained in detail. As depicted in FIG. 3, the software management unit 114 is constructed from a business application software identification unit 116, a resource allocation unit 117, a resource management unit 118, and a resource increase/decrease detection unit 119.

The business application software identification unit 116 has a function that detects the business application software 115 registered in the software management unit 114 and identifies the structure of each piece of business application software 115. Moreover, the business application software identification unit 116 provides the resource allocation unit 117 with the identification results of the business application software 115.

The resource allocation unit 117 has a function that allocates the resources to each piece of business application software 115 according to a preset resource allocation policy. The resource allocation unit 117 provides the resource management unit 118 with information of the resource amount to be allocated to each piece of business application software 115.

The resource management unit 118 has a function that actually secures the resource from the OS 113 and returns the resource to the OS 113 based on the information provided by the resource allocation unit 117 about the resource amount allocated to each piece of business application software 115. Moreover, the resource management unit 118 also has a function that aggregates the usage of the resources in each piece of business application software 115.

The resource increase/decrease detection unit 119 has a function that detects an increase or decrease of the resource amount of the virtual machine 112. The resource increase/decrease detection unit 119 notifies the resource allocation unit 117 or the resource management unit 118 of the detected results.

(3) Details of Operations of Server System (3-1) Outlines of Operations of Server System Next, the outlines of the operations of the virtualization server 100 will be explained. As depicted in FIG. 4, the business application software 115 is firstly registered in the software management unit 114 for the virtualization server 100 in accordance with input operations by, for example, the administrator (STEP 11).

When the business application software 115 is registered in the software management unit 114 in STEP 11, the business application software identification unit 116 identifies the structure of the registered business application software and registers the structure of the business application software in the business application software list management table 310 (STEP 12).

Specifically speaking, the software management unit 114 identifies each piece of business application software 115 based on a program boundary which is a component unit or execution unit of a plurality of programs included in the business application software 115. Moreover, the software management unit 114 identifies each piece of business application software 115 based on location information which is communication information with an external system of the business application software 115. Then, the software management unit 114 registers identification information of the business application software 115 in the business application software list management table 310.

The business application software list management table 310 is a table for managing the structure of each piece of business application software; and, for example, a business application software list management table 310A or 310B can be taken as an example as depicted in FIG. 5. The business application software list management table 310A is information registered when the business application software is identified based on the above-mentioned program boundary; and the business application software list management table 310B is information registered when the business application software is identified based on the aforementioned location information.

The business application software list management table 310A is constituted from a number column 3101, a boundary type column 3102, an identification column 3103, a hierarchy column 3104, and an application column 3105.

The number column 3101 stores an item number assigned to the relevant application. The boundary type column 3102 stores the type of boundary information for identifying the relevant program. Under this circumstance, the boundary type of the program is a component unit or execution unit for a plurality of program groups included in the business application software 115. For example, in a case of a Java program, the boundary type column 3102 stores "Java Archive," which means that the software management unit 114 identifies the relevant program by using Java's archive unit. The Java's archive unit means, for example, a class loader unit which is set for each multi-level archive such as "JAR (Java Archive)," "WAR (Web Archive)," or "EAR (Enterprise Archive)." Moreover, in a case of a program of a language other than JAVA, for example, the business application software 115 can be identified in units such as library files or execution module files. The identification column 3103 stores boundary information of the identified program. In a case of a Java program, the hierarchy column 3104 stores hierarchy information whose identified class loader is the Java archive. Then, the application column 3105 stores the name by which the business application software 115 is identified.

Moreover, the business application software list management table 310B is constituted from a number column 3111, a location type column 3112, an identification column 3113, an attribute column 3114, and an application column 3115.

The number column 3111 stores an item number assigned to the relevant application. The location type column 3112 stores the type of location information for identifying the relevant program. The location information for identifying the relevant program is identification information used when the business application software 115 communicates with an external system; and the location information, for example, in a case of web application software is an URL (Uniform Resource Locator) which indicates the location over the Internet. Moreover, the location information in a case of other network communications is, for example, communication information identified by an IP address, a port number, and so on. Moreover, the location information in a case of inter-process communication within the same system is, for example, information of a process identifier. The identification column 3113 stores the identified location information such as an URL or an IP address.

The attribute column 3114 stores attribute information of the location information. For example, parameter information or login information can be taken as an example of the attribute information. For example, even if the same URL is stored in the identification column 3113, but if parameter information or login information is different, such a program can be distinguished as a different business application program 115. Then, the application column 3115 stores the name by which the business application software 115 is identified.

Referring back to FIG. 4, the explanation about the outlines of the operations of the virtualization server 100 will continue. After the registration of the business application software 115 in STEP 11, the business application software 115 is executed according to the input operation by, for example, the administrator (STEP 14). After the business application software 115 is executed in STEP 14, the resource allocation unit 117 allocates the resource to each piece of business application software 115 (STEP 15). Specifically speaking, the resource allocation unit 117 allocates the resource to each piece of business application software 115 with reference to the resource allocation policy management table 320.

The resource allocation policy management table 320 is a table for managing policies to allocate the resource to each piece of business application software 115; and as depicted in FIG. 6, resource allocation policy management tables 320A, 320B, 320C can be taken as examples of the resource allocation policy management table 320. The resource allocation policy management table 320A is a table to which reference is made when changing a resource allocation amount by the ratio maintenance method; and a ratio of the resource amount which can be used for the business application software 115 is set. Moreover, the resource allocation policy management tables 320B and 320C are tables to which reference is made when changing the resource allocation amount by a sharing adjustment method; and an upper limit or lower limit of the resource amount, which can be used for the business application software 115, and an amount of resources which can be shared are set.

The resource allocation policy management table 320A is a table for managing a ratio of CPU capacity, which can be used for the business application software 115, and is constituted from a number column 3201, an application column 3202, a policy type column 3203, an upper limit column 3204, and a lower limit column 3205. The number column 3201 stores an item number assigned to the relevant application. The application column 3202 stores the name of application identified by the business application software identification unit 116. The policy type 3203 stores the resource allocation policy, that is, "Ratio Maintenance" which indicates the ratio maintenance method. The upper limit column 3204 stores an upper limit value when allocating the resource by the ratio maintenance method. The lower limit value 3205 stores a lower limit value when allocating the resource by the ratio maintenance method. Incidentally, both the upper limit value and the lower limit value, or only one of them may be set.

The resource allocation policy management table 320B is a table for managing a memory capacity allocation amount, which can be used for the business application software 115, and is constituted from a number column 3211, an application column 3212, a policy type column 3213, an upper limit column 3214, a lower limit column 3215, and sharing column 3216. The number column 3211 stores an item number assigned to the relevant application. The application column 3212 stores the name of the application identified by the business application software identification unit 116. The policy type 3213 stores the resource allocation policy, that is, "Sharing Adjustment" which indicates the sharing adjustment method. The upper limit column 3214 stores the upper limit value used when allocating the resource by the sharing adjustment method. The lower limit value 3215 stores the lower limit value used when allocating the resource by the sharing adjustment method. The sharing column 3216 stores the capacity of shared resources which can be used when it is necessary to use the memory in excess of the upper limit value or the lower limit value. When the resource amount of the virtual machine 112 increases or decreases, the amount of shared resources stored in the sharing column 3261 is changed.

Moreover, the resource allocation policy management table 320C is a table for managing a connection capacity allocation amount, which can be used for the business application software 115, and is constituted from a number column 3221, an application column 3222, a policy type column 3223, an upper limit column 3224, a lower limit column 3225, and a sharing column 3226. Since the content stored in each column is the same as that of the resource allocation policy management table 320B, any detailed explanation has been omitted.

Referring back to FIG. 4, the explanation about the outlines of the operations of the virtualization server 100 will continue. After the resource allocation unit 117 allocates the resource to each piece of business application software 115 in STEP 15, the resource management unit 118 secures the resource from the OS 113 or returns the resource to the OS 113 (STEP 16). Then, the resource management unit 118 stores information of the resource, which is actually allocated to each piece of business application software 115, in the resource management table 330. Furthermore, the resource management unit 118 aggregates the resource amount used for the business application software 115 and provides the resource usage management table 340 to the resource increase/decrease detection unit 119.

Figure 7:
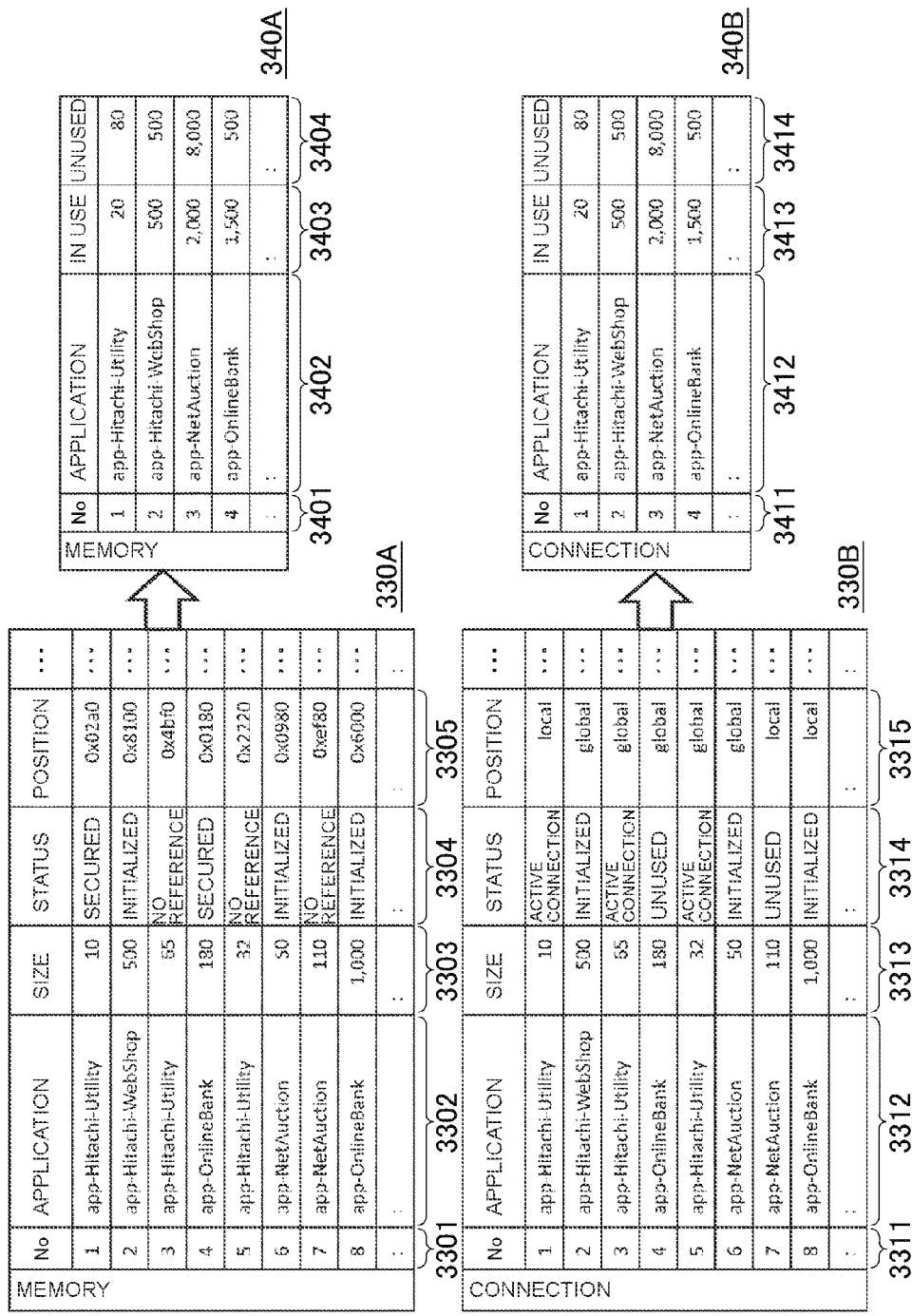
FIG. 7 is a chart illustrating an example of a resource management table according to the embodiment.

The resource management table 330 is a table for managing information of the resource which is actually allocated to each piece of business application software 115; and as depicted in FIG. 7, for example, a resource management table 330A or 330B can be taken as an example of the resource management table 330.

The resource management table 330A is a table for managing information of the memory allocated to each piece of business application software 115 and is constituted from a number column 3301, an application column 3302, a size column 3303, a status column 3304, and a position column 3305.

The number column 3301 stores an item number assigned to the relevant application. The application column 3302 stores the name of the application identified by the business application software identification unit 116. The size column 3303 stores the size of the memory actually allocated to the business application software 115. The status column 3304 stores information about the status of the resource, for example, whether the resource such as the memory has been secured or not. The position 3305 stores location information of the secured memory.

The resource management table 330B is a table for managing information of connections allocated to each piece of business application software 115 and is constituted from, for example, a number column 3311, an application column 3312, a size column 3313, a status column 3314, and a position column 3315.

The number column 3311 stores an item number assigned to the relevant application. The application column 3312 stores the name of the application identified by the business application software identification unit 116. The size column 3313 stores the size of the connection (communication line) actually allocated to the business application software 115. The status column 3314 stores information about the status of the relevant connection, for example, whether the connection (communication line) has been secured or not. The position 3315 stores information about, for example, whether the secured connection is a connection to connect to an external device or a connection to connect to an internal device.

Referring back to FIG. 4, the resource amount of the virtual machine 12 is changed according to the input operation by, for example, the administrator (STEP 17). After the resource amount of the virtual machine 12 is changed in STEP 17, the resource increase/decrease detection unit 119 detects an increase or decrease of the resource amount of the virtual machine 112 (STEP 18). Specifically speaking, the resource increase/decrease detection unit 119 detects change information of the resource amount, which is issued from the hypervisor 111 or the hypervisor management software 210 of the management server 200, and notifies the resource management unit 118 of the change information.

Moreover, the resource increase/decrease detection unit 119 may detect a change of the resource amount by periodically obtaining (polling) the resource amount information of the OS 113. In this case, the resource management unit 118 detects whether the resource amount has changed or not, by referring to the resource usage management table 340 and comparing the resource amount which is currently used, with the resource amount of the OS 113. The resource management unit 118 secures an additional resource from the OS 113 or frees the resource in accordance with the change information of the resource mount reported by the resource increase/decrease detection unit 119.

The resource usage management table 340 is a table for managing the usage of the resource by each piece of business application software 115; and as depicted in FIG. 7, a resource usage management table 340A or 340B can be taken as an example of the resource usage management table 340.

The resource usage management table 340A is a table for managing information about the memory used by the business application software 115 and is constituted from a number column 3401, an application column 3402, an in-use column 3403, and an unused column 3404.

The number column 3401 stores an item number assigned to the relevant application. The application column 3402 stores the name of the application identified by the business application software identification unit 116. The in-use column 3403 stores a memory capacity used by each piece of business application software 115. Moreover, the unused column 3404 stores an unused memory capacity of the memory capacity allocated to each piece of business application software 115.

The resource usage management table 340B is a table for managing information about connections used by the business application software 115 and is constituted from a number column 3411, an application column 3412, an in-use column 3413, and an unused column 3414.

The number column 3411 stores an item number assigned to the relevant application. The application column 3412 stores the name of the application identified by the business application software identification unit 116. The in-use column 3413 stores a connection capacity used by each piece of business application software 115. Moreover, the unused column 3414 stores an unused connection capacity of the connection capacity allocated to each piece of business application software 115.

(3-2) Details of Business Application Software Identification Processing

Next, the details of the business application software identification processing will be explained. Examples of the methods for identifying the business application software can include the method based on the program boundary and the method based on the location information as mentioned earlier.

Figure 8A:
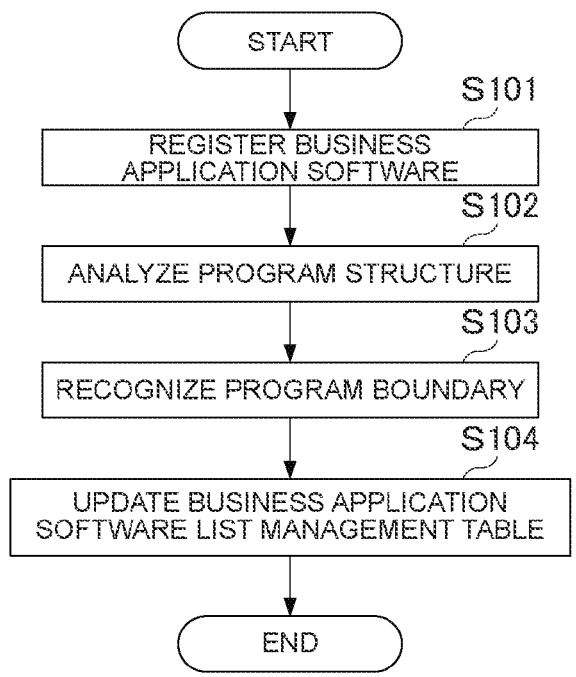
FIG. 8A is a flowchart illustrating business application software identification processing according to the embodiment.

Firstly, the method for identifying the business application software based on the program boundary will be explained. As depicted in FIG. 8A, Firstly, the software management unit 114 registers the business application software (S101).

Then, the business application identification unit 120 analyzes a component unit and an execution unit for a group of programs of the business application software registered in step S101 (S102). Then, the business application identification unit 120 recognizes the program boundary analyzed in step S102 (S103). Specifically speaking, the business application identification unit 120 identifies the program boundary in Java's archive units or identifies the program boundary in units such as library files or execution module files.

Then, the business application identification unit 120 associates the program boundary recognized in step S103 with the name of the application and registers them in the business application software list management table 310 (S104).

Figure 8B:
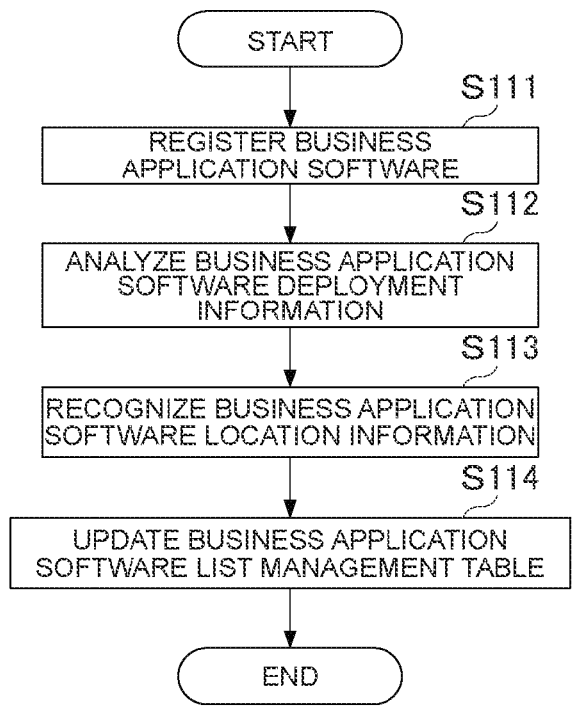
FIG. 8B is a flowchart illustrating the business application software identification processing according to the embodiment.

Next, the method for identifying the business application software based on the location information will be explained. As depicted in FIG. 8B, the software management unit 114 firstly registers the business application software (S111).

Then, the business application identification unit 120 analyzes deployment information of the business application software registered in step S111 (S112). Specifically speaking, the business application identification unit 120 analyses how the business application software is deployed, by checking, for example, if the business application software is for web business or network communication.

Then, the business application identification unit 120 recognizes location information of the business application software in the deployment information analyzed in step S113 (S113). Specifically speaking, the business application identification unit 120 recognizes, for example, an URL indicating the location on the Internet, an IP address, or a port number.

Then, the business application identification unit 120 associates the location information of the application recognized in step S113 with the name of the application and registers them in the business application software list management table 310 (S114).

(3-3) Details of Resource Allocation Processing

Next, the details of the resource allocation processing will be explained. When the resource is required upon initialization of the business application software 115 or during the operation of the business application software 115, the resource allocation processing is executed. Moreover, when the processing by the business application software 115 is terminated or when the resource is no longer necessary during the operation of the business application software 115, the resource is collected from the business application software.

Allocation or collection of the resource to or from the business application software 115 is performed on a program basis as identified by the aforementioned business application software identification processing. The allocation or collection of the resource to or from the business application software 115 is performed based on, for example, an upper limit or lower limit for an allocation amount or an allocation amount per time, which is set in advance to the resource allocation policy table 320. Moreover, examples of the resource allocation method can include the allocation method by the ratio maintenance method and the allocation method by the sharing adjustment method as mentioned earlier.

Figure 9A:
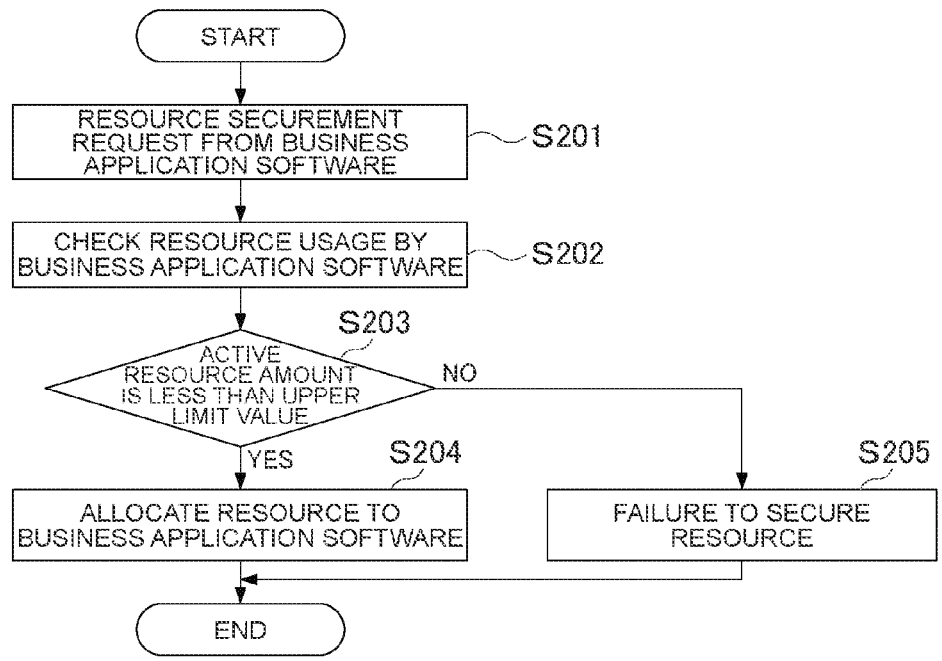
FIG. 9A is a flowchart illustrating the details of resource allocation processing according to the embodiment.

As depicted in FIG. 9A, the software management unit 114 receives a resource securement request from the business application software 115 (S201). Then, the resource allocation unit 117 checks the resource usage by the business application software 115 (S202). Specifically speaking, the resource allocation unit 117 checks the current resource usage by referring to the resource usage management table 340.

Then, the resource allocation unit 117 judges whether the resource amount which is being used by the business application software 115 is less than a specified upper limit value or not (S203). Then, if it is determined in step S203 that the resource amount which is being used by the business application software 115 is less than the specified upper limit value, the resource allocation unit 117 allocates the resource to the business application software 115 (S204). Specifically speaking, the resource allocation unit 117 associates the name of the business application software 115 with the size of the allocated resource and registers them in the resource management table 330.

On the other hand, if it is determined in step S203 that the resource amount which is being used by the business application software 115 exceeds the specified upper limit value, the resource allocation unit 117 notifies the business application software 115 of the failure to secure the resource (S205).

Figure 9B:
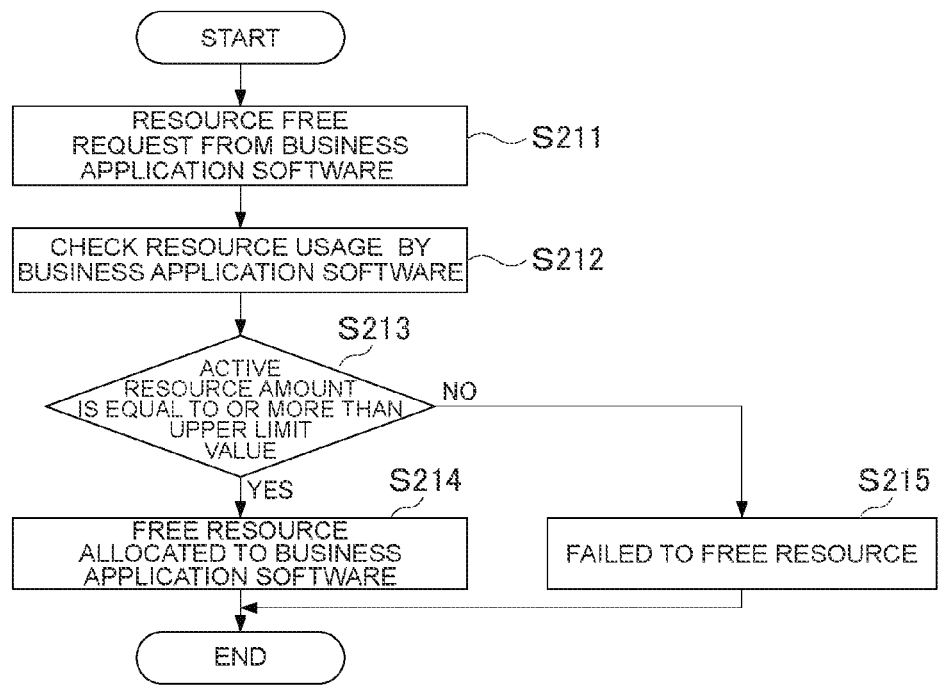
FIG. 9B is a flowchart illustrating the details of the resource allocation processing according to the embodiment.

Next, resource collection processing by the resource allocation unit 117 will be explained. As depicted in FIG. 9B, the software management unit 114 receives a resource free request from the business application software 115 (S211). Then, the resource allocation unit 117 checks the resource usage by the business application software 115 (S212). Specifically speaking, the resource allocation unit 117 checks the current resource usage by referring to the resource usage management table 340.

Then, the resource allocation unit 117 judges whether the resource amount which is being used by the business application software 115 is equal to or more than a specified lower limit value (S213). Then, if it is determined in step S213 that the resource amount which is being used by the business application software 115 is equal to or more than the specified lower limit value, the resource allocation unit 117 frees the allocation of the resource to the business application software 115 (S214). Specifically speaking, the resource allocation unit 117 deletes the business application software 115, for which the resource allocation is freed, from the resource management table 330.

On the other hand, if it is determined in step S213 that the resource amount which is being used by the business application software 115 is less than the specified lower limit value, the resource allocation unit 117 notifies the business application software 115 of the failure to free the resource (S215).

Figure 10:
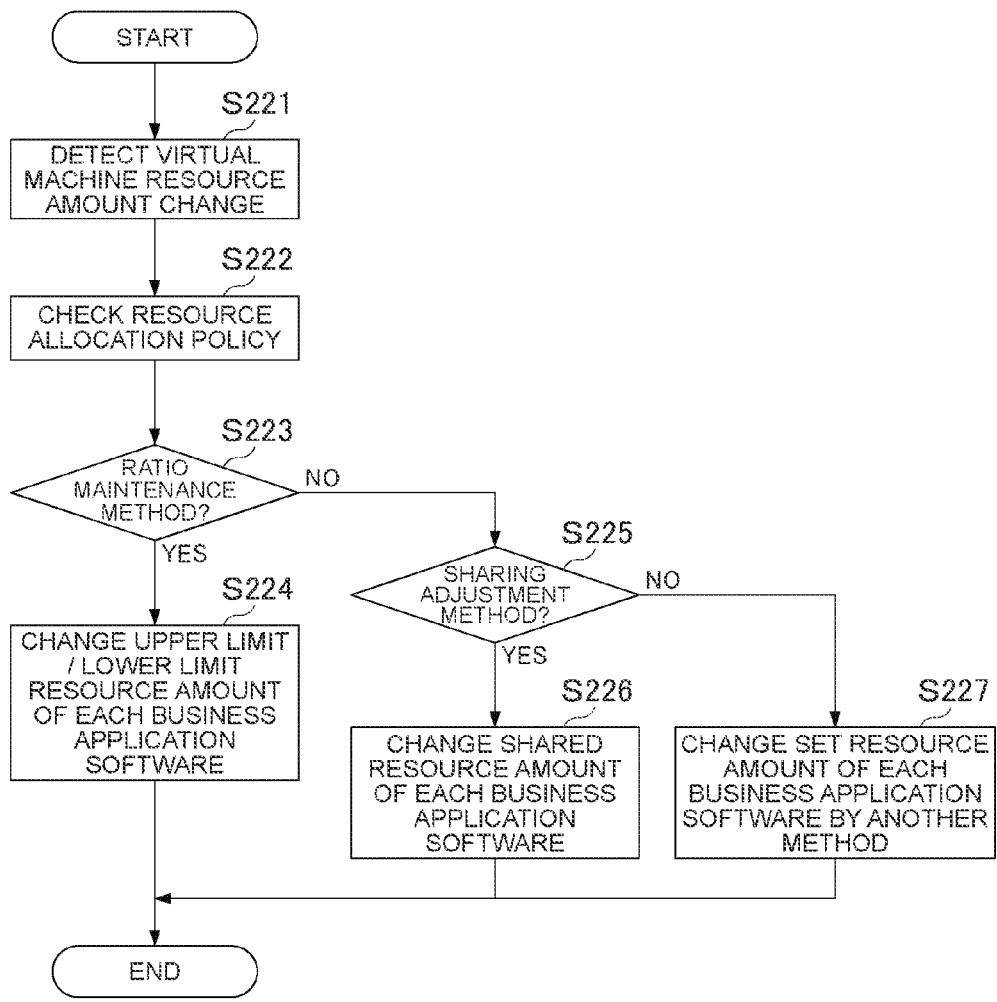
FIG. 10 is a flowchart illustrating the details of the resource allocation processing according to the embodiment.

Next, resource amount change processing by the resource allocation unit 117 will be explained. As depicted in FIG. 10, the resource allocation unit 117 firstly detects a change of the resource amount of the virtual machine 112 (S221). Specifically speaking, the resource allocation unit 117 is notified by the resource increase/decrease detection unit 119 of an increase or decrease of the resource amount of the virtual machine 112.

Then, the resource allocation unit 117 checks the resource allocation policy (S222). Specifically speaking, the resource allocation unit 117 checks if the resource allocation policy is the ratio maintenance method or the sharing adjustment method, by referring to the resource allocation policy management table 320.

Then, the resource allocation unit 117 judges whether the resource allocation policy is the ratio maintenance method or not (S223). If it is determined in step S223 that the resource allocation policy is the ratio maintenance method, the resource allocation unit 117 changes the upper limit and lower limit of the resource amount for each piece of business application software 115 (S224). Specifically speaking, the resource allocation unit 117 calculates the upper limit value and the lower limit value of the resource amount from the entire resource amount by referring to the upper limit and lower limit ratios in the resource allocation policy management table 320.

Moreover, if it is determined in step S223 that the resource allocation policy is not the ratio maintenance method, the resource allocation unit 117 judges whether the resource allocation policy is the sharing adjustment method or not (S225). If it is determined in step S225 that the resource allocation policy is the sharing adjustment method, the resource allocation unit 117 changes the shared resource amount for each piece of business application software 115 (S226). Specifically speaking, the resource allocation unit 117 increases or decreases the shared resource amount in the resource allocation policy management table 320. Moreover, if it is determined in step S225 that the resource allocation policy is not the sharing adjustment method, the resource allocation unit 117 changes the set resource amount for each piece of business application software by another method (S227). Under this circumstance, an example of another method in step S227 can be a priority order method. Specifically speaking, by the priority order method, the priority order of resource allocation is assigned to each application in the policy management table 320. Then, when the resource increases, the upper limit value is increased in the descending order of the priority order in the policy management table 320. Moreover, when the resource decreases, the upper limit value is decreased in the ascending order of the priority order.

(3-4) Details of Resource Management Processing

Next, the details of the resource management processing will be explained. When the resource amount of the virtual machine 112 increases, the resource management unit 118 secures the resource from the OS 113; and when the resource amount decreases, the resource management unit 118 returns the resource to the OS 113. When the resource amount of the virtual machine is changed or not is reported by the resource increase/decrease detection unit 119 as mentioned earlier.

Figure 11A:
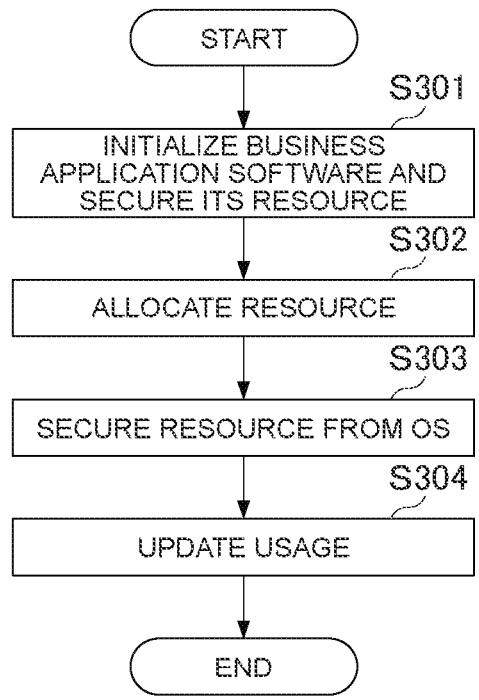
FIG. 11A is a flowchart illustrating the details of resource management processing according to the embodiment.

As depicted in FIG. 11A, the software management unit 114 firstly executes initialization of the business application software 115 and secures the resource (S301). Then, the resource allocation unit 117 executes the aforementioned resource allocation processing, thereby allocating the resource to the business application software 115 (S302).

Then, the resource management unit 118 secures the resource allocated in step S302 from the OS 113 (S303). Then, the resource management unit 118 updates the usage (S304). Specifically speaking, the resource management unit 118 increases the in-use resource amount in the resource usage management table 340 and decreases the unused resource amount (S304).

Figure 11B:
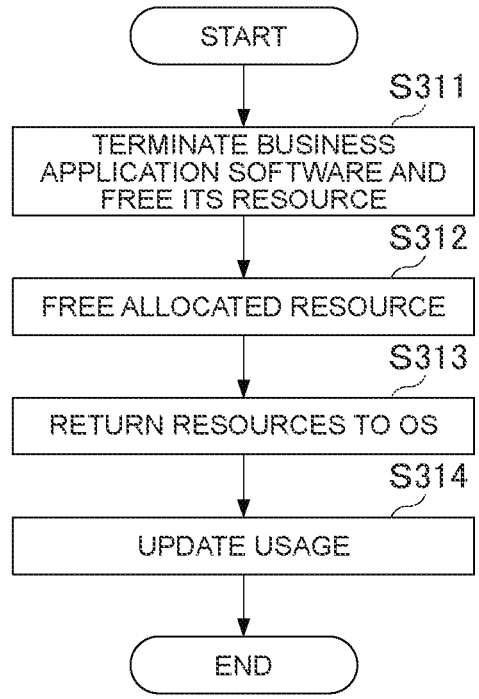
FIG. 11B is a flowchart illustrating the details of the resource management processing according to the embodiment.

Moreover, as depicted in FIG. 11B, the software management unit 114 terminates the business application software 115 and frees the resource (S311). Subsequently, the resource allocation unit 117 executes the aforementioned resource allocation freeing processing, thereby freeing the allocation of the resource to the business application software 115 (S312).

Then, the resource management unit 118 returns the resource, which was freed in step S312, to the OS 113 (S313). Then, the resource management unit 118 updates the usage (S314). Specifically speaking, the resource management unit 118 increases the in-use resource amount in the resource usage management table 340 and decreases the unused resource amount (S314).

Figure 12:
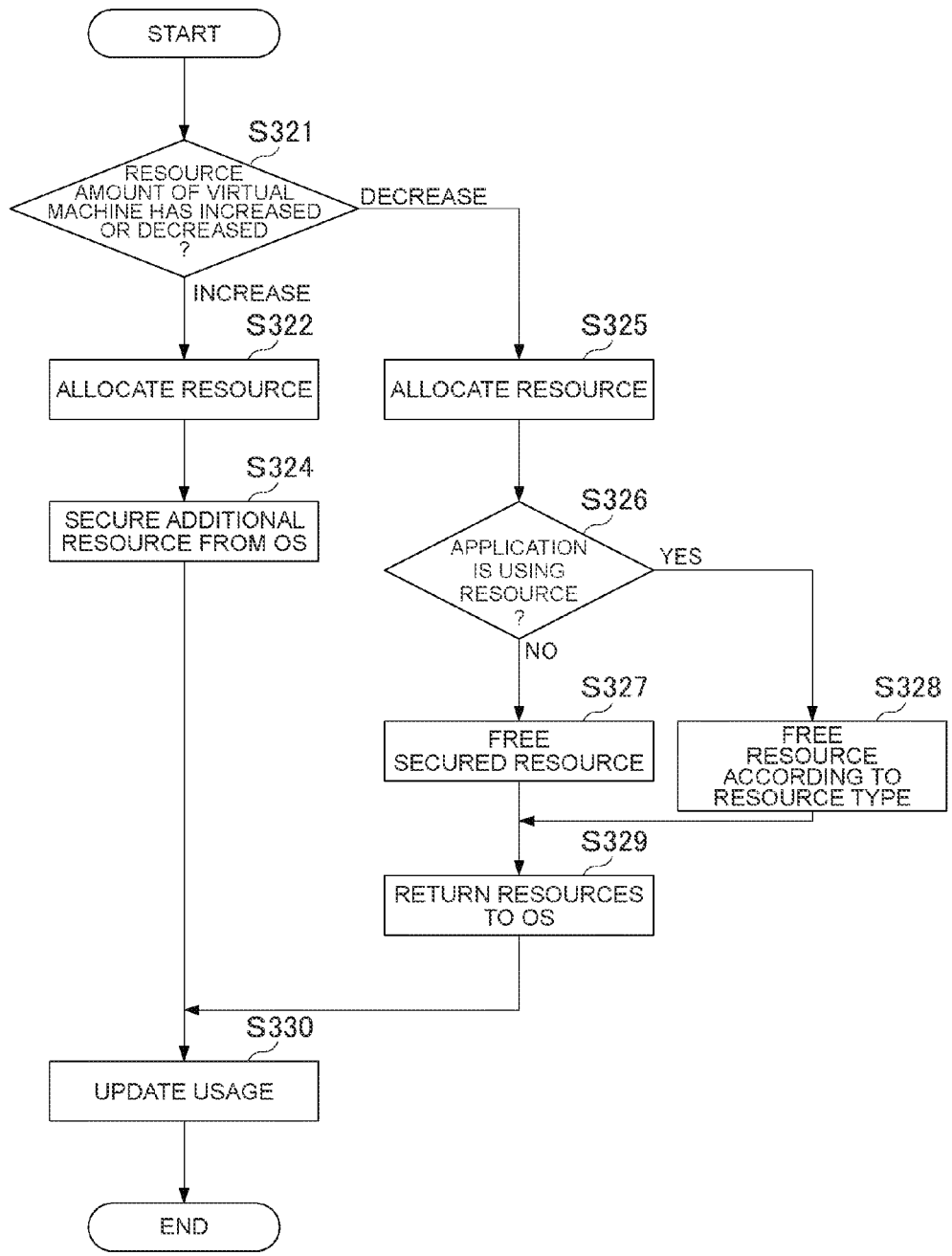
FIG. 12 is a flowchart illustrating the details of resource allocation or resource allocation freeing processing according to the embodiment.

Next, resource allocation or resource allocation freeing processing executed when the resource amount of the virtual machine 112 has changed will be explained. As depicted in FIG. 12, the resource management unit 118 firstly judges whether the resource amount for the virtual machine 112 has increased or decreased, based on the notice from the resource increase/decrease detection unit 119 (S321).

If it is determined in step S321 that the resource amount for the virtual machine 112 has increased, the resource allocation unit 117 executes the resource allocation processing, thereby allocating the resource to the business application software 115 (S322). Then, the resource management unit 118 adds and secures the resource, which was allocated in step S322, from the OS 113 (S323).

On the other hand, if it is determined in step S321 that the resource amount for the virtual machine 112 has decreased, the resource allocation unit 117 executes the resource allocation freeing processing, thereby freeing the allocation of the resource to the business application software 115 (S325). Then, the resource management unit 118 judges whether the resource is being used by the business application software 115 or not (S326).

If it is determined in step S326 that the resource is not being used by the business application software 115, the resource management unit 118 frees the secured resource (S327). On the other hand, if it is determined in step S326 that the resource is being used by the business application software 115, the resource management unit 118 frees the resource according to the resource type (S328). The resource freeing processing according to the resource type in step S328 will be explained later in detail.

Then, the resource management unit 118 returns the resource to the OS 113 (S329). After the resource management unit 118 secures the resource in step S324 or returns the resource in step S329, it updates the resource amount in the resource usage management table (S330).

Figure 13:
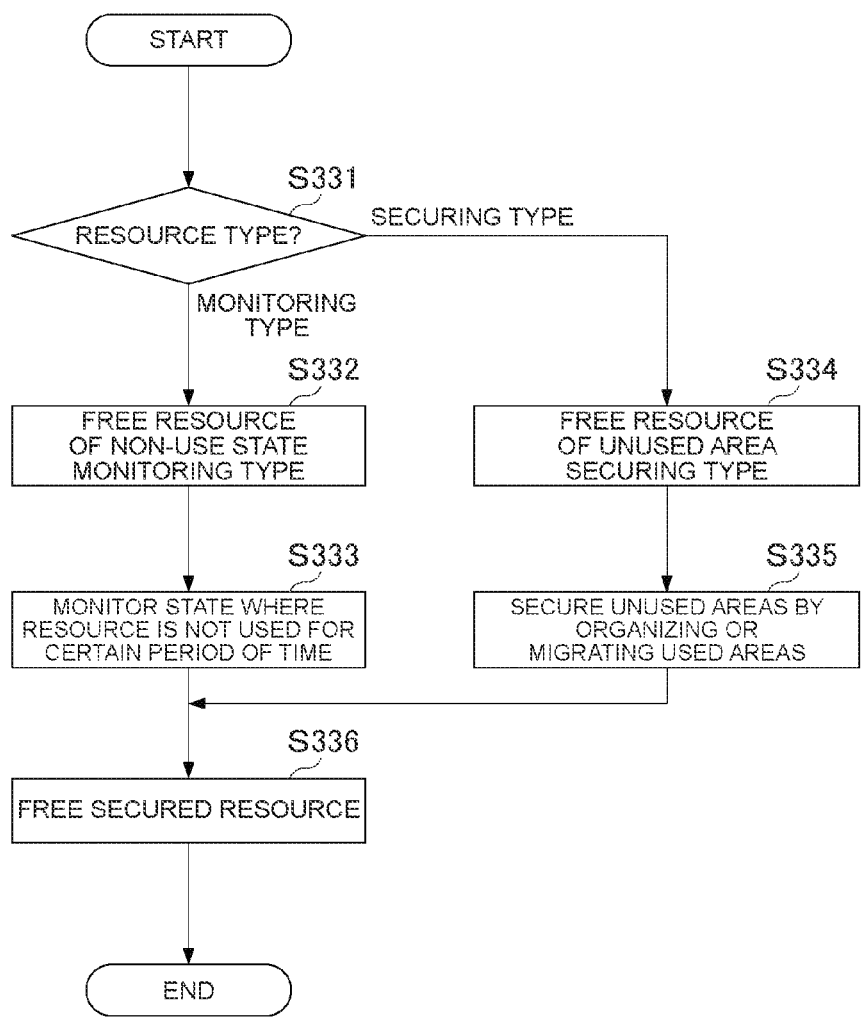
FIG. 13 is a flowchart illustrating the details of resource freeing processing according to the embodiment.

Next, the details of the resource freeing processing according to the resource type as executed in step S328 will be explained. As depicted in FIG. 13, the resource management unit 118 firstly judges the resource type (S331). If it is determined in step S331 that the resource type is a non-use state monitoring type, the resource management unit 118 executes processing for freeing the resource of the non-use state monitoring type (S332). Examples of the type of resources to be freed because of the non-use state monitoring type can include real-time sessions and connections.

Then, the resource management unit 118 monitors the state where the resource is not used for a certain period of time (S333). Specifically speaking, for example, in a case of sessions, the resource management unit 118 monitors session time-out; and in a case of connections, the resource management unit 118 monitors no connection time-out.

On the other hand, if it is determined in step S331 that the resource type is an unused area securing type, the resource management unit 118 executes processing for freeing the resource of the unused area securing type (S334). Examples of the type of resources to be freed because of the unused area securing type can include heap memories, cache memories, shared memories, and disk areas.

Then, the resource management unit 118 secures an unused area by organizing and migrating used areas (S335). Then, the resource management unit 118 frees the resource secured by monitoring the non-use state in step S333 and securing the unused area (S336).

(3-5) Details of Resource Increase/decrease Detection Processing

Next, the details of the resource increase/decrease detection processing will be explained. The resource increase/decrease detection unit 119 detects a change of the resource amount for the virtual machine 112 and gives the resource management unit 118 the momentum to secure an additional resource from, or free the resource from, the OS 113. There are three possible methods executed by the resource increase/decrease detection unit 119 for detecting a change of the resource amount for the virtual machine 112 as follows.

A first method is for the software management unit 114 in the virtual machine 112 to receive an event issued from the hypervisor 111 when the hypervisor 111 changes the resource amount for the virtual machine 112. This method can be implemented by incorporating software such as a virtualization driver capable of responding to the function of the hypervisor 111 into the OS 113.

A second method is for the software management unit 114 in the virtual machine 112 to receive an event issued from the hypervisor management software 210 when the hypervisor management software 210 of the management server 200 changes the resource amount for the virtual machine 112. This method can be implemented by communication processing between the hypervisor management software 210 and the virtual machine 112.

A third method is for the software management unit 114 to recognize the change of the resource by periodically obtaining (polling) the resource amount information of the OS 113.

Processing for detecting a change of the resource amount by the first and second methods of receiving an event and the third method by polling will be explained below.

Figure 14:
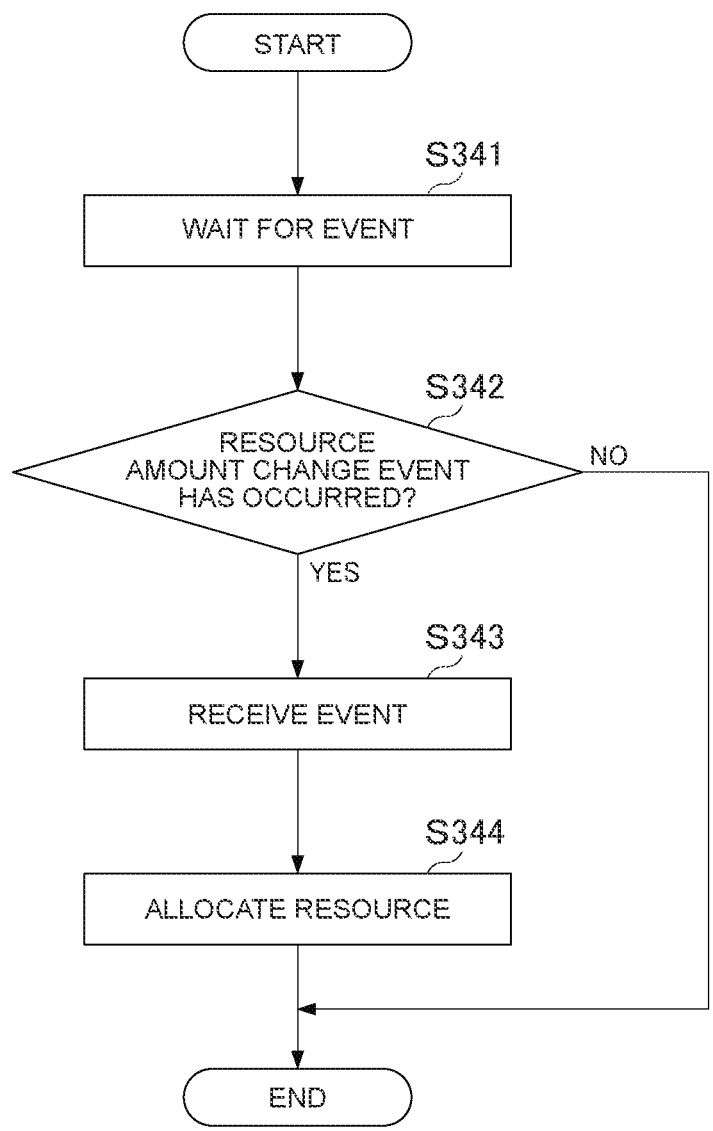
FIG. 14 is a flowchart illustrating resource amount change detection processing according to the embodiment.

As depicted in FIG. 14, the resource increase/decrease detection unit 119 waits for an event to occur from the hypervisor 111 or the hypervisor management software 210 of the management server 200 (S341). Then, the resource increase/decrease detection unit 119 judges whether an event of the change of the resource amount has occurred or not (S341). Specifically speaking, if the resource amount for the virtual machine 112 changes, an event is generated by the hypervisor 111 or the hypervisor management software 210 of the management server 200 to report that the resource amount has changed. The resource increase/decrease detection unit 119 detects whether the relevant event has occurred or not.

If it is determined in step S342 that the event has occurred, the resource increase/decrease detection unit 119 receives that event (S343). On the other hand, if it is determined in step S342 that the event has not occurred, the resource increase/decrease detection unit 119 terminates the processing.

Then, the resource increase/decrease detection unit 119 notifies the resource allocation unit 117 of the reception of the event in step S343 and the resource allocation unit 117 then allocates the resource to, or frees the allocation of the resource to, each piece of business application software 115 based on the reported information of the resource change amount (S344).

Figure 15:
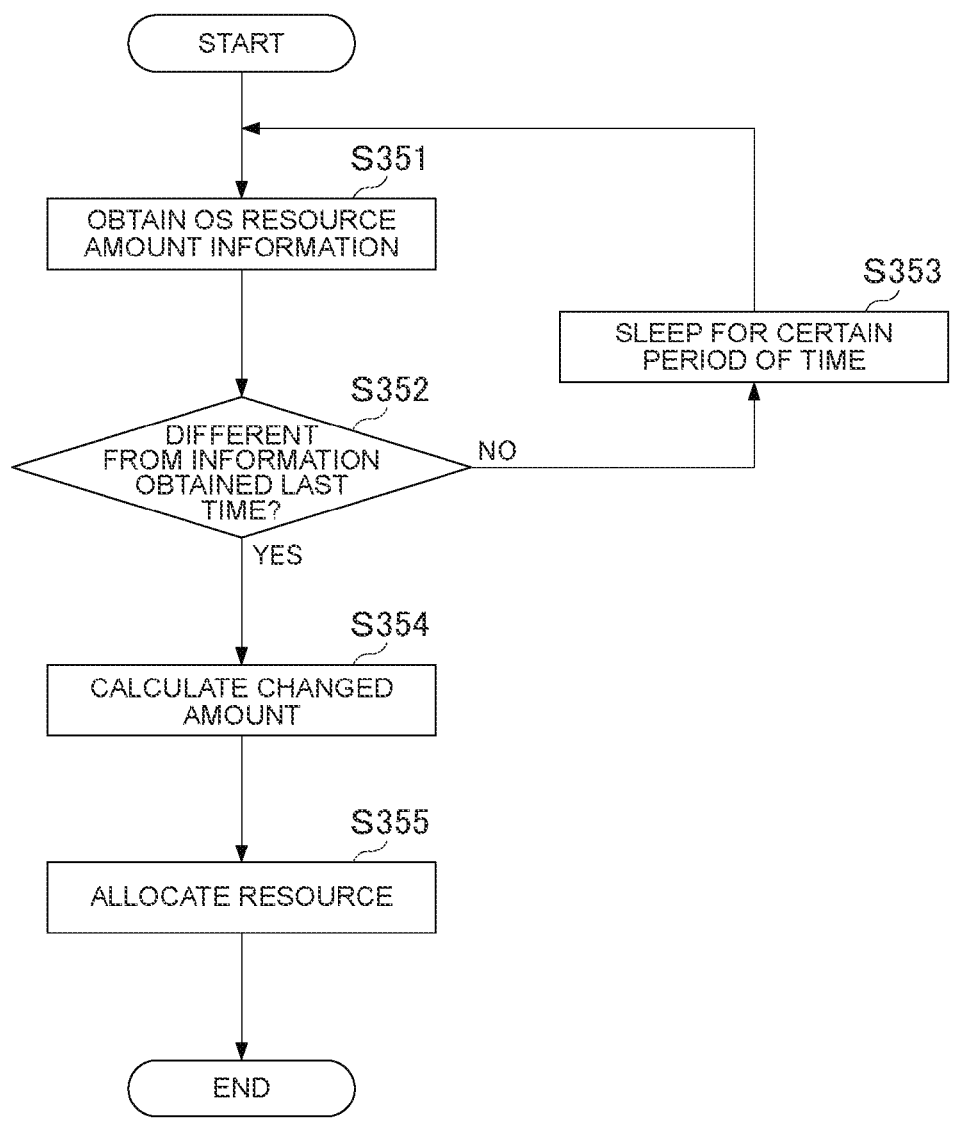
FIG. 15 is a flowchart illustrating the resource amount change detection processing according to the embodiment.

Next, processing for detecting a change of the resource amount by means of polling will be explained. As depicted in FIG. 15, the resource increase/decrease detection unit 119 firstly obtains the resource amount information of the OS 113 (S351). Then, the resource increase/decrease detection unit 119 judges whether there is any difference between the resource amount information of the OS 113, which was obtained in step S351, and the resource amount information of the OS 113, which was obtained last time (S352).

If it is determined in step S352 that there is no difference in the resource amount information, the resource increase/decrease detection unit 119 sleeps for a certain period of time (S353) and then repeats the processing in step S351 and subsequent steps. On the other hand, if it is determined in step S352 that there is a difference in the resource amount information, the resource increase/decrease detection unit 119 calculates a changed amount of the resource amount (S354).

Then, the resource increase/decrease detection unit 119 notifies the resource allocation unit 117 of the resource change amount calculated in step S354 and the resource allocation unit 117 allocates the resource to each piece of business application software 115 or frees the resource allocation based on the reported information of the resource change amount (S355).

(4) Advantageous Effects of this Embodiment

When the resource amount of each virtual machine 112 in the computer system 1 according to this embodiment described above is changed flexibly by server virtualization, the software management unit 114 can dynamically detect the change of the resource amount for the virtual machines and the change of the resource amount can be reflected appropriately in each piece of business application software. Therefore, it is no longer necessary to allocate the resource amount manually and the stable operation of the system can be realized by reducing operating cost of the entire system and enhancing the resource use efficiency.

(5) Other Embodiments

Incidentally, in the aforementioned embodiments, the CPU 120 for the virtualization server 100 implements various functions such as the software management unit (software management unit 114), the identification unit (application software identification unit 116), the resource allocation unit (resource allocation unit 117), the resource management unit (resource management unit 118), and the detection unit (resource increase/decrease detection unit 119) according to the present invention in accordance with various programs stored in the memory of the virtualization server 100; however, the present invention is not limited to such examples. For example, the CPU 120 may be installed in another apparatus separate from the virtualization server 100 so that various functions may be implemented in cooperation with that CPU 120. Furthermore, the various programs stored in the virtualization server 100 may be stored in another apparatus separate from the virtualization server 100 and such programs may be invoked by the CPU 120, thereby implementing the various functions.

INDUSTRIAL APPLICABILITY

The present invention can be applied to a computer system for managing resources for virtual machines.

REFERENCE SIGNS LIST

1 computer system
100 virtualization server
110 main storage
111 hypervisor
112 virtual machine
113OS
114 software management unit
115 business application software
116 business application software identification unit
117 resource allocation unit
118 resource management unit
119 resource increase/decrease detection unit
120 CPU
130 auxiliary storage
200 management server
202 CPU
204 auxiliary storage
206 main storage
208 the OS
210 hypervisor management software

The invention claimed is:

1. A server system constructed on a physical machine equipped with a physical resource including at least a processor and a storage device, wherein the server system comprising a plurality of virtual machines, each of the virtual machines includes:
an OS recognizing the physical resource allocated to the virtual machine as a resource in the virtual machine; and
a software management unit for securing the resource recognized by the OS and allocating the resource to a plurality of pieces of business application software registered in the virtual machine;
wherein the software management unit:
identifies, when executing each program, the plurality of pieces of business application software based on a program boundary which is a component unit or execution unit of a plurality of programs included in the plurality of pieces of business application software and,
identifies, if the plurality of programs included in the plurality of pieces of business application software are Java, by using Java's archive unit, wherein the Java's archive unit is based on a class loader unit which is set for each multi-level archive having a hierarchy information that identify class loader
after the business application software is executed:
allocating the resource to the plurality of pieces of business application software according to a preset policy to allocate the resource; and
changing, when detecting an increase or decrease of the resource allocated to the virtual machine, allocation of the resource to the plurality of pieces of business application software in accordance with an amount of the detected resource increase or decrease.

2. The server system according to claim 1, wherein the software management unit includes: an identification unit for identifying the plurality of pieces of business application software; a resource allocation unit for allocating the resource to the plurality of pieces of business application software identified by the identification unit in accordance with a preset policy to allocate the resource; a resource management unit for securing the resource, which is allocated by the resource allocation unit, from the OS; and a detection unit for detecting an increase or decrease of the resource allocated to the virtual machine; wherein when the detection unit detects the increase or decrease of the resource allocated to the virtual machine, the resource allocation unit changes the allocation of the resource to the plurality of pieces of business application software according to an increase or decrease amount of the resource, and the resource management unit secures the resource, which has been allocated by the resource allocation unit, from the OS.

3. The server system according to claim 2, wherein the identification unit identifies the plurality of pieces of business application software and retains a list of the business application software in a business application software list management table.

4. The server system according to claim 2, wherein the software management unit includes a resource allocation policy management table in which a policy to allocate the resource is set to each of the plurality of pieces of business application software; and wherein the resource allocation unit allocates the resource to the plurality of pieces of business application software according to the policy to allocate the resource, which is set in the resource allocation policy management table, associates the business application software with an amount of the allocated resource, and retains them in a resource management table.

5. The server system according to claim 2, wherein the identification unit identifies the plurality of pieces of business application software based on a program boundary which is a component unit or execution unit of a plurality of programs included in the business application software; and wherein the policy to allocate the resource, which is set in the resource allocation policy management table, is a ratio maintenance method of setting a ratio of resource which can be used for the plurality of pieces of business application software.

6. The server system according to claim 2, wherein the identification unit identifies the plurality of pieces of business application software based on a program boundary which is a component unit or execution unit of a plurality of programs included in the business application software; and wherein the policy to allocate the resource, which is set in the resource allocation policy management table, is a sharing adjustment method of setting an upper limit value or lower limit value of a resource amount to each of the plurality of pieces of business application software and setting an amount of shared resource which can be used for any business application when the resource amount exceeds the set upper limit value or lower limit value.

7. The server system according to claim 2, wherein the resource management unit associates an amount of the resource secured from the OS with a resource amount actually used by the plurality of pieces of business application software and retains them in a resource usage management table.

8. The server system according to claim 2, wherein when the resource management unit frees the resource secured from the OS, it judges whether the resource is being used by the business application software or not; and if it is determined that the resource is being used by the business application software, the resource management unit frees the resource according to a type of the resource.

9. The server system according to claim 8, wherein after judging that the resource was being used by the plurality of pieces of business application software, the resource management unit detects a state, where the resource has not been used for a specified period of time because of time-out, and frees the resource.

10. The server system according to claim 8, wherein the resource management unit secures an unused area by organizing or migrating used areas of the resource, thereby freeing the resource.

11. The server system according to claim 2, further comprising a hypervisor for providing the virtual machine on the physical machine equipped with the physical resource, wherein when a resource amount of the virtual machine is changed by the hypervisor, the detection unit detects a change of the resource amount based on change information of the resource amount, which is issued from the hypervisor.

12. The server system according to claim 11, wherein when another apparatus separate from the server system is equipped with hypervisor management software for managing the resource amount of the virtual machine, and when the resource amount of the virtual machine is changed by the hypervisor management software, the detection unit detects the change of the resource amount based on change information of the resource amount, which is issued from the hypervisor management software.

13. The server system according to claim 11, wherein the software management unit periodically obtains resource amount information of the OS; and wherein the detection unit detects the change of the resource amount by calculating a difference between the resource amount of the OS at present and the resource amount of the OS in the past.

14. A resource management method using a server system constructed on a physical machine equipped with a physical resource providing a plurality of virtual machines, wherein each of the virtual machines includes:
an OS recognizing the physical resource allocated to the virtual machine as a resource in the virtual machine; and
a software management unit for securing the resource recognized by the OS and allocating the resource to a plurality of pieces of business application software registered in the virtual machine;
wherein the resource management method comprising the steps executed by the software management unit to:
identifying, when executing each program, the plurality of pieces of business application software based on a program boundary which is a component unit or execution unit of a plurality of programs included in the plurality of pieces of business application software and,
identifies, if the plurality of programs included in the plurality of pieces of business application software are Java, by using Java's archive unit, wherein the Java's archive units is based on a class loader unit which is set for each multi-level archive having a hierarchy information that identify class loader;
after the business application software is executed:
allocating the resource to the plurality of pieces of business application software according to a preset policy to allocate the resource; and
changing when detecting an increase or decrease of the resource allocated to the virtual machine, changing allocation of the resource to the plurality of pieces of business application software in accordance with an amount of the detected resource increase or decrease.

15. A program residing in a non-transitory computer readable medium having a program allowing a computer to function as a server system, the server system including:
an identification unit for identifying, when executing each program, a plurality of pieces of business application software registered in a virtual machine constructed on a physical machine equipped with a physical resource;
a resource allocation unit for allocating the resource to the plurality of pieces of business application software identified by the identification unit based on a program boundary which is a component unit or execution unit of a plurality of programs included in the plurality of pieces of business application software and, identifies, if the plurality of programs included in the plurality of pieces of business application software are Java, by using Java's archive unit, wherein the Java's archive units is based on a class loader unit which is set for each multi-level archive having a hierarchy information that identify class loader, in accordance with a preset policy to allocate the resource;
a resource management unit for securing the resource, which is allocated by the resource allocation unit, from the OS in the virtual machine; and a detection unit for detecting an increase or decrease of the resource allocated to the virtual machine;
wherein when the detection unit detects the increase or decrease of the resource allocated to the virtual machine,
the resource allocation unit changes the allocation of the resource to the plurality of pieces of business application software according to an increase or decrease amount of the resource, and
the resource management unit secures the resource, which has been allocated by the resource allocation unit, from the OS.

* * * * *